(12) United States Patent
Vogan et al.

(10) Patent No.: US 8,935,459 B2
(45) Date of Patent: Jan. 13, 2015

(54) HEURISTICS FOR PROGRAMMING DATA IN A NON-VOLATILE MEMORY

(75) Inventors: Andrew W. Vogan, Portland, OR (US); Daniel J. Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 13/415,231

(22) Filed: Mar. 8, 2012

(65) Prior Publication Data

US 2013/0238833 A1 Sep. 12, 2013

(51) Int. Cl.
*G06F 12/12* (2006.01)

(52) U.S. Cl.
USPC .............................. 711/103; 711/154; 711/165

(58) Field of Classification Search
CPC ........................... G06F 12/0246; G11C 29/34
USPC .......................................... 711/103, 154, 165
See application file for complete search history.

(56) References Cited

U.S. PATENT DOCUMENTS

2009/0259797 A1* 10/2009 Meir ............................. 711/103

OTHER PUBLICATIONS

U.S. Appl. No. 12/983,715, filed Jan. 3, 2011.

* cited by examiner

*Primary Examiner* — Jae Yu
(74) *Attorney, Agent, or Firm* — Van Court & Aldridge LLP

(57) ABSTRACT

Systems and methods are disclosed for heuristics associated with programming data in a non-volatile memory ("NVM"). One or more applications can generate information that notifies a system of the amounts of recoverable and unrecoverable new data that will be programmed to an NVM. Based on this information, the system can calculate the amount of new data that needs to be placed in a bulk mode instead of a SLC mode. By utilizing multi-modal modes of an NVM effectively, the system can improve overall performance and reduce the probability of unnecessary garbage collection.

11 Claims, 7 Drawing Sheets

HEURISTICS FOR PROGRAMMING DATA IN A NON-VOLATILE MEMORY

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

An NVM may include blocks containing multiple memory cells, where each memory cell can be configured either as a single-level cell ("SLC") or a multi-level cell ("MLC"). When a block is operating in a MLC mode, the block is capable of storing more data as compared to a block operating in a SLC mode. However, the MLC mode is generally less reliable than the SLC mode. That is, a block operating in a MLC mode may be more susceptible to read errors as compared to a block operating in a SLC mode.

For performance purposes, a system having an NVM can initially store data in a SLC mode. Then, when additional space needs to be freed up in the NVM, the stored data can be compacted to a MLC mode. Such a compacting process, however, may be inefficient and may unnecessarily wear out the NVM. Furthermore, such a compacting process can cause a loss of bandwidth and increase the probability of user-perceptible delays.

SUMMARY OF THE DISCLOSURE

Systems and methods are disclosed for heuristics associated with programming data in a non-volatile memory ("NVM"). One or more applications can generate information that notifies a system of the amounts of recoverable and unrecoverable new data that will be programmed to an NVM. Based on this information, the system can calculate the amount of new data that needs to be placed in a bulk mode instead of a SLC mode. As used herein, a "bulk mode" can refer to a mode in which a block or super block of the NVM is capable of storing multiple bits per memory cell. In contrast, a "SLC mode" can refer to a mode in which a block or super block of the NVM is capable of storing a single bit per memory cell. By utilizing multi-modal modes of an NVM effectively, the system can improve overall performance and reduce the probability of unnecessary garbage collection.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for heuristics associated with programming data in a non-volatile memory ("NVM") are provided. One or more applications can generate information that notifies an NVM interface of a system of the amounts of recoverable and unrecoverable new data that will be programmed to an NVM. As used herein, "recoverable" data can refer to a class of data that is capable of being restored (e.g., by downloading the data from a remote and/or local data source). In contrast, "unrecoverable" data can refer to a class of data that is not capable of being restored. Thus, once unrecoverable data becomes corrupted or missing, the data is no longer available.

Based on this information, the NVM interface can calculate the amount of new data that needs to be placed in a bulk mode instead of a SLC mode. As used herein, a "bulk mode" can refer to a mode in which a block or super block of the NVM is capable of storing multiple bits per memory cell. A "SLC mode" can refer to a mode in which a block or super block of the NVM is capable of storing a single bit per memory cell.

An application can be associated with (e.g., can have or can download) one or more assets (e.g., one or more files). In some embodiments, the NVM interface can sort assets based on reliability attributes (e.g., recoverable and unrecoverable attributes) and/or locality attributes (e.g., static and dynamic attributes) of the assets. In some embodiments, as a result of this sorting, the NVM interface can internally separate data corresponding to the assets into a SLC flow and a bulk flow. In particular, the NVM interface can first attempt to program all of the data in a SLC mode. However, if the NVM interface determines that not all of the data can be stored in the SLC mode, the NVM interface can determine an amount of new data to program in a bulk mode.

In other embodiments, instead of separating data into flows that are associated with characteristics of super blocks of a NVM (e.g., a SLC flow and a bulk flow), the NVM interface can separate data into flows or streams that are associated with particular reliability attributes and/or locality attributes. That is, based on the reliability attributes and/or the locality attributes of data, and particularly, macroscale or microscale alternating patterns of the reliability attributes and/or the locality attributes, the NVM interface can separate the data into a suitable number of streams.

Figure 1:
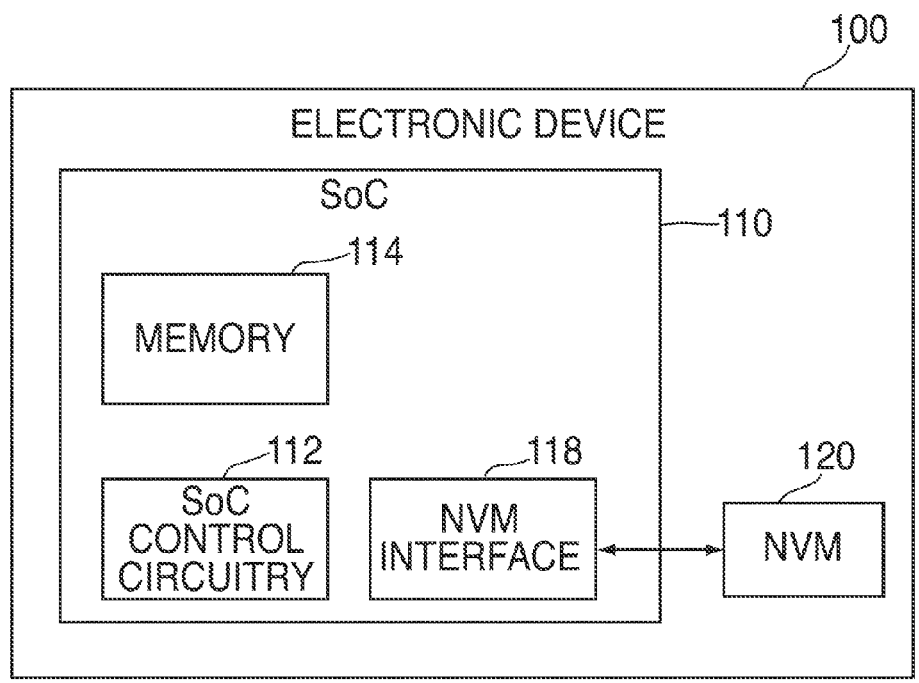
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), semiconductor-based or non-semiconductor-based non-volatile memory, or any combination thereof.

NVM 120 can be organized into "blocks", which can be the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

Physically, a block of NVM 120 can include an array of memory cells aligned in rows corresponding to "word lines". The memory cells of a block may be configured to store any suitable number of bits per memory cell. For example, memory cells that are referred to as single-level cells ("SLC") may be capable of storing one bit per cell. As another example, memory cells that are referred to as multi-level cells ("MLC") or bulk cells may be capable of storing multiple bits per cell (e.g., two bits per cell, three bits per cell, etc.). The number of pages in a given block may correspond to the number of bits stored per memory cell. For example, a block being used as a 2-bit bulk block may include twice the number of pages as when the same block is being used as an SLC block.

The increased density of storage associated with bulk memory cells can improve space efficiency. That is, a block or super block configured in a bulk mode may be capable of storing more data as compared to a block or super block configured in a SLC mode. However, the increased density of storage associated with bulk memory cells can also reduce storage reliability and access speed (e.g., increasing the amount of time needed for reading, programming, and/or trimming). Thus, a block or super block configured in a SLC mode may be more reliable (e.g., less susceptible to read errors), less space efficient, and faster as compared to a block or super block configured in a bulk mode. In some embodiments, one or more blocks or super blocks of NVM 120 can be configured in parity modes (e.g., XOR-parity modes or redundant array of independent disks ("RAID") parity modes). For example, when combined with SLC, a block or super block can have a SLC-XOR mode. As another example, when combined with bulk, a block or super block can have a bulk-XOR mode. The parity mode can be considered more reliable than the non-parity mode (e.g., probability of failure of the parity mode can be the square of the probability of failure of the non-parity mode).

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

Figure 2:
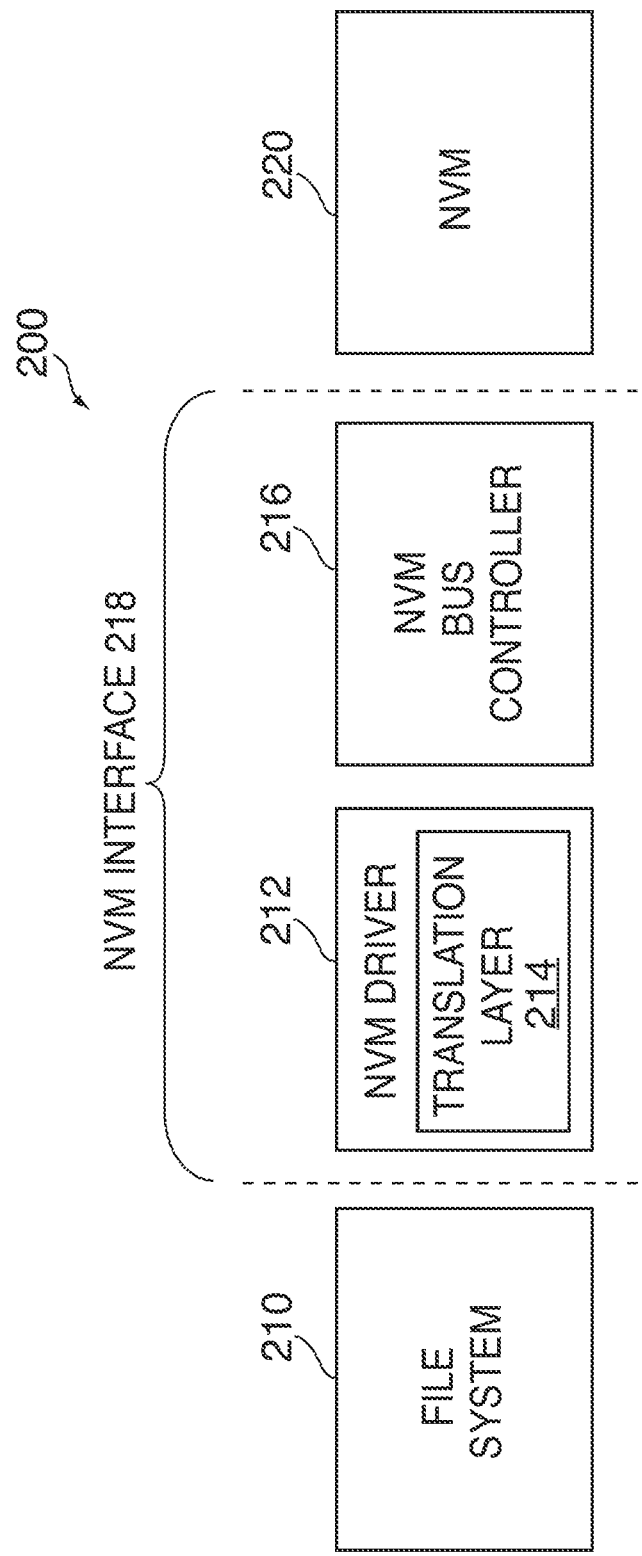

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read requests to NVM driver 212 when the application or operating system requests that information be read from or stored in NVM 220. Along with each read or write request, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write request, translation layer 214 can map the provided logical address to a free, erased physical location on NVM 220. On a read request, translation layer 214 can use the provided logical address to determine the physical address at which the requested data is stored. Because each NVM may have a different layout depending on the size or vendor of the NVM, this mapping operation may be memory and/or vendor-specific.

In addition to logical-to-physical address mapping, translation layer 214 can perform any other suitable functions that may be typical of flash translation layers, such as garbage collection ("GC") and wear leveling.

In some embodiments, NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, ECC data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

Conventionally, by default, a system may store data in blocks of an NVM (e.g., NVM 120 of FIG. 1 or NVM 220 of FIG. 2) that are configured in bulk modes. All of the data is consequently stored in the least reliable mode.

In other devices, in order to improve performance, a system may initially store data in blocks that are configured in SLC modes. Then, when additional space needs to be freed up in the NVM, the stored data can be compacted to a bulk mode. For example, during garbage collection, the stored data can be moved to blocks that are configured in bulk modes.

This compacting process can be relatively efficient when only a small portion of an NVM (e.g., 40%-50%) is storing data. However, when an NVM becomes substantially full, such a compacting process may take a long time to complete. In addition, for an NVM that is substantially full, this compacting process can require more energy and can wear out the NVM at a faster rate in comparison to a system that initially selects to store the data in a bulk mode.

Accordingly, an NVM interface of a system (e.g., NVM interface 118 of FIG. 1 or NVM interface 218 of FIG. 2) can utilize information provided by one or more applications in order to determine an appropriate mode for programming data associated with a particular application. In particular, the one or more applications can generate information that notifies the NVM interface of the amount of new data that will be programmed to an NVM. Based on this information, the NVM interface can calculate the amount of new data that needs to be placed in a bulk mode instead of a SLC mode. By utilizing multi-modal modes of an NVM effectively, the system can improve performance and reduce the probability of unnecessary garbage collection.

In addition to instead of an NVM interface, persons skilled in the art will appreciate that any other suitable component of the system (e.g., a controller of an NVM such as NVM 120 of FIG. 1 or NVM 220 of FIG. 2) can determine an appropriate mode for programming data. Persons skilled in the art will also appreciate that instead of selecting to store data in two modes (e.g., a bulk mode and a SLC mode), the NVM interface can select to store data in three or more modes. For example, the NVM interface can select to store data in a one bit per cell mode, a two bits per cell mode, and a three bits per cell mode. As another example, the NVM interface can select to store data in a SLC mode, a bulk mode, a SLC-XOR mode, and a bulk-XOR mode.

Persons skilled in the art will further appreciate that the two modes that are selected may be arbitrary so long as one of the two modes is more reliable and less space efficient (e.g., one of the modes may have more bits per cell than the other mode). Thus, in some embodiments, instead of a bulk mode and a SLC mode, the NVM interface can select to place a first amount of data in a two bits per cell mode and a second amount of data in a three bits per cell mode. In other embodiments, the two modes can include a parity mode (e.g., a XOR-parity mode or a RAID parity mode) and a non-parity mode. For the sake of simplicity, however, the discussion below will refer to one mode as a SLC mode and the other mode as a bulk mode.

Figure 3:
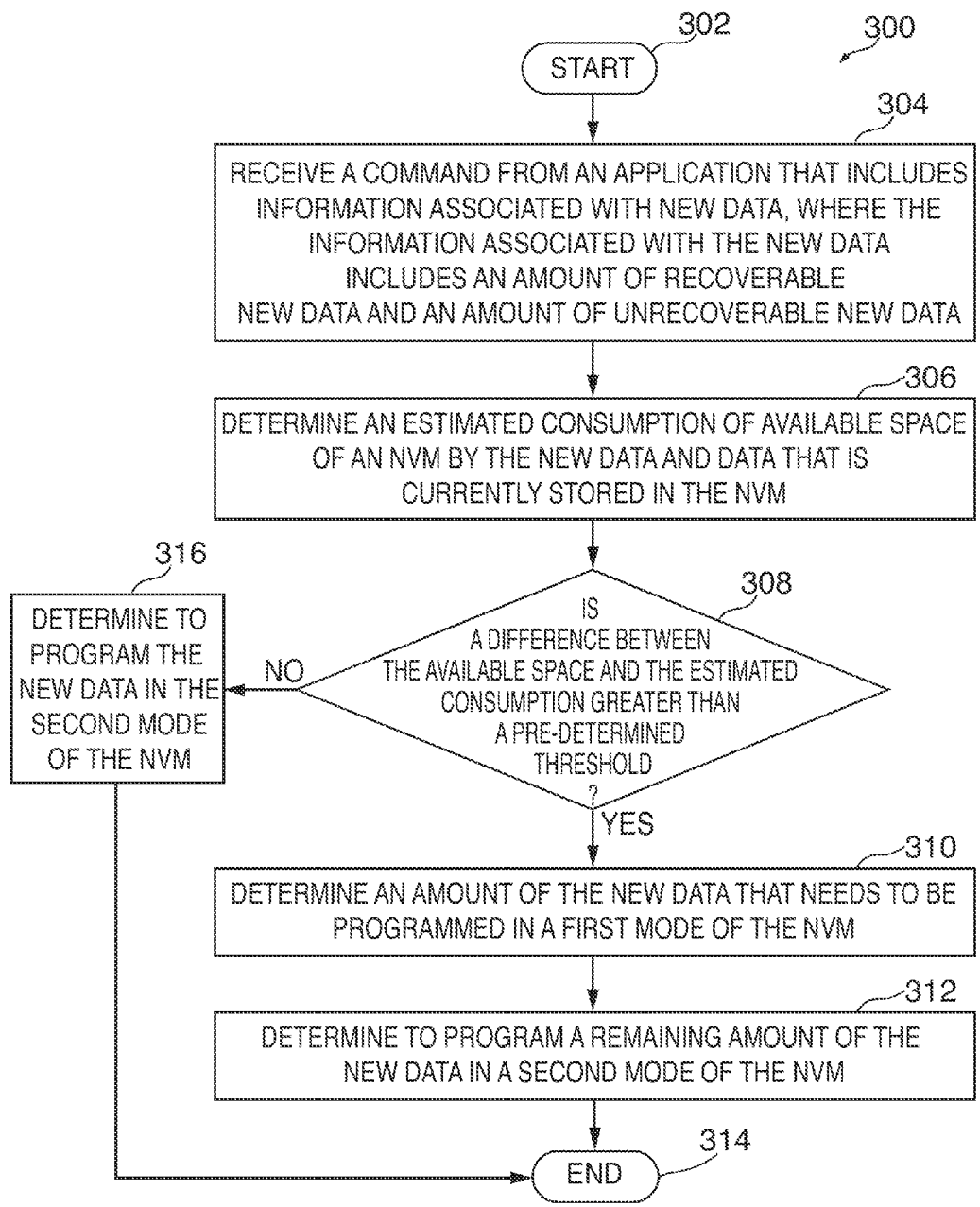
FIG. 3 is a flowchart of an illustrative process for configuring a non-volatile memory in accordance with various embodiments of the invention.

Turning now to FIG. 3, a flowchart of illustrative process 300 is shown for configuring an NVM (e.g., NVM 120 of FIG. 1 or NVM 220 of FIG. 2). Process 300 may begin at step 302, and at step 304, an NVM interface (e.g., NVM interface 118 of FIG. 1 or NVM interface 218 of FIG. 2) can receive a command from an application (e.g., a daemon of the system) that includes information associated with new data, where the information associated with the new data includes an amount of recoverable new data and an amount of unrecoverable new data. That is, the application may transmit its expectations regarding the quality and quantity of new data before actually transmitting the new data to the NVM interface. In particular, the quantity of new data can allow the NVM interface to determine the frequencies of use of the different NVM modes. In some embodiments, the new data may include only non-replacement data (e.g., data that is not already stored on an NVM).

As used herein, "recoverable" data can refer to a class of data that is capable of being restored (e.g., by downloading the data from a remote and/or a local data source). For example, once a system discovers that recoverable data stored on the system is corrupted or missing, the data can be downloaded from a data source via a wired or wireless link. In contrast, "unrecoverable" data can refer to a class of data that is not capable of being restored. Thus, once unrecoverable data becomes corrupted or missing, the data is no longer available.

Continuing to step 306, the NVM interface can determine an estimated consumption of available space of an NVM by the new data and data that is currently stored in the NVM. For example, the available space of the NVM can correspond to a total number of super blocks of the NVM that are available for programming. In some embodiments, the available space of the NVM may exclude an amount of reserved space. As used herein, the "reserved space" can be a pre-determined amount of space of the NVM that can be used during garbage collection or for other purposes (e.g., for moving invalid data). In some cases, the amount of reserved space can be equal to a pre-determined percentage of the total storage capacity of the NVM (e.g., 7%-20%).

The estimated consumption can equal the number of super blocks of the NVM that may be consumed by the new data and the data that is currently stored in the NVM. In some embodiments, the estimated consumption may not correspond to the actual physical consumption by the new data and the data currently stored in the NVM. Rather, the estimated consumption may correspond to the consumption of an ideal arrangement of data on the NVM. In some cases, this arrangement may be similar to an arrangement of data after a garbage collection process performed on the NVM.

In some embodiments, the NVM interface can calculate the estimated consumption according to:

$$C = (\text{current\_recoverable} + \text{new\_recoverable}) * \text{bulk\_cost} + (\text{current\_unrecoverable} + \text{new\_unrecoverable}) * SLC\_\text{cost} \quad (1),$$

where C corresponds to the estimated consumption, current_recoverable corresponds to recoverable data currently stored in the NVM, new_recoverable corresponds to new recoverable data that will be received, bulk_cost corresponds to the cost of storing data in a bulk mode, current_unrecoverable corresponds to unrecoverable data currently stored in the NVM, new_unrecoverable corresponds to new unrecoverable data that will be received, and SLC_cost corresponds to the cost of storing data in a SLC mode.

In some embodiments, the costs of storing data in the various modes can be normalized based on a default mode. For example, the default mode can be a bulk mode, where bulk_cost can be defined to have a default value of one. Thus, if the bulk mode corresponds to two bits per cell, SLC_cost can be equal to two. Likewise, if the bulk mode corresponds to three bits per cell, SLC_cost can be equal to three.

At step 308, the NVM interface can determine whether a difference between the available space and the estimated consumption is greater than a pre-determined threshold. The pre-determined threshold can have any suitable value such as, for example, 40% of the available space of the NVM.

If, at step 308, the NVM interface determines that the difference between the available space and the estimated consumption is greater than the pre-determined threshold, process 300 may move to step 310. That is, the NVM interface may determine that there is a constraint on the amount of space that is available for programming the new data.

For example, an NVM may have an available space of 32 GB. Thus, the pre-determined threshold can be equal to 12.8 GB (e.g., 32 GB*0.4). If there is 8 GB of unrecoverable data currently stored in a SLC mode (current_unrecoverable) and the NVM interface receives information that 2 GB of new unrecoverable data will be transmitted (new_unrecoverable), C can be equal to 20 if the SLC_cost is defined to have a value of two (e.g., (8 GB+2 GB)*2). Thus, because the difference between the available space and C (e.g., 32−20=12) is less than the pre-determined threshold (e.g., 12.8), the NVM interface may determine that there is a constraint on the amount of space that is available for programming the new data.

Continuing to step 310, the NVM interface can determine an amount of the new data that needs to be programmed in a first mode (e.g., a bulk mode) of the NVM. Then, at step 312, the NVM interface can determine to program a remaining amount of the new data in a second mode of the NVM (e.g., a SLC mode). In other embodiments, the NVM interface can determine to program a remaining amount of the new data in two or more modes of the NVM (e.g., a SLC mode, a SLC-XOR mode, and/or a bulk-XOR mode). Process 300 may then end at step 314.

If, at step 308, the NVM interface instead determines that the difference between the available space and the estimated consumption is less than or equal to the pre-determined threshold, process 300 may move to step 316. That is, the NVM interface may determine that there is no constraint on the amount of space that is available for programming the new data.

At step 316, the NVM interface can determine to program the new data in the second mode (e.g., the SLC mode) of the NVM. Process 300 may then end at step 314.

Figure 4A:
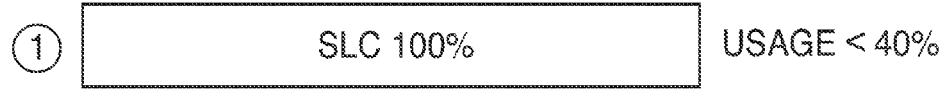
FIGS. 4A-4C are illustrative usage models of a non-volatile memory in accordance with various embodiments of the invention.
Figure 4B:
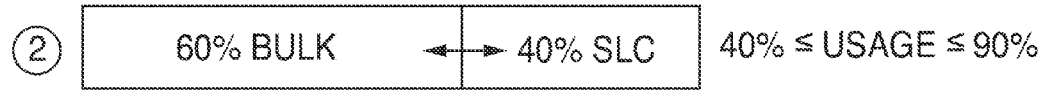
Figure 4C:
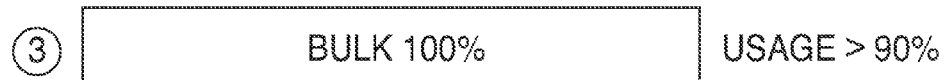

FIGS. 4A-4C are illustrative usage models of a non-volatile memory. The usage thresholds (e.g., 40% and 90%) shown in FIGS. 4A-4C can correspond to the amount of available space of the NVM that is occupied with valid data. Persons skilled in the art will appreciate that the usage thresholds of FIGS. 4A-4C are merely illustrative. Thus, any suitable usage threshold(s) may be selected by a system.

Turning first to FIG. 4A, in a scenario where the usage is less than 40%, 100% of the available space of an NVM (e.g., NVM 120 of FIG. 1 or NVM 220 of FIG. 2) can be configured in a SLC mode. Thus, if a user has a device where less than 40% of the NVM is currently being used, a more reliable and faster performance can be obtained from the NVM.

As another example, as shown in FIG. 4C, in a scenario where the usage is greater than 90%, 100% of the available space of an NVM can be configured in a bulk mode. Hence, if an NVM is mostly full, all of the available space of the NVM can be configured in a bulk mode.

As yet another example, as shown in FIG. 4B, in a scenario where the usage is between 40% and 90%, a particular percentage of the available space of an NVM can be configured in a bulk mode, and the remaining percentage of the available space can be configured in a SLC mode. As shown in FIG. 4B, 60% of the available space is configured in a bulk mode, and 40% of the available space is configured in a SLC mode.

The actual percentages of the available space that are configured in a bulk mode versus a SLC mode can vary based on one or more factors such as, for example, the amount of space that is available, one or more reliability attributes of the data (e.g., recoverable or unrecoverable data), and/or one or more locality attributes of the data (e.g., static or dynamic data). Reliability and locality attributes will be discussed in more detail in connection with FIGS. 5-9.

Given the usage models of FIGS. 4A-4C, a worst case scenario may occur when the current usage of a system is at 39% (e.g., corresponding to the usage model of FIG. 4A), and the system subsequently receives information that the amount of new data that will be transmitted is equal to 61% of the available space. In such a case, the system may need to perform garbage collection on the NVM. That is, the system may need to move data that is currently stored in a SLC mode, and instead store the data in a bulk mode. Although this may be an inefficient process, the magnitude of inefficiency may be reduced because block modality decisions are made with a larger scope of information (e.g., on the order of GBs and not MBs).

Thus, by varying the storage configurations of an NVM based on usage models, the device can appear to function more reliably, particularly in comparison to an approach where data is only stored in a MLC mode. Moreover, by receiving information associated with new data from an application in advance of the actual arrival of the new data, the system can make longer term decisions regarding the storage configurations of the NVM as compared to a conventional approach where applications do not provide such information. In these conventional approaches, the scope of information that is available to a system is limited (e.g., equal to the depth of a command queue). Finally, higher write bandwidth rates of the NVM can be observed (e.g., assuming there are no system bottlenecks).

Figure 5:
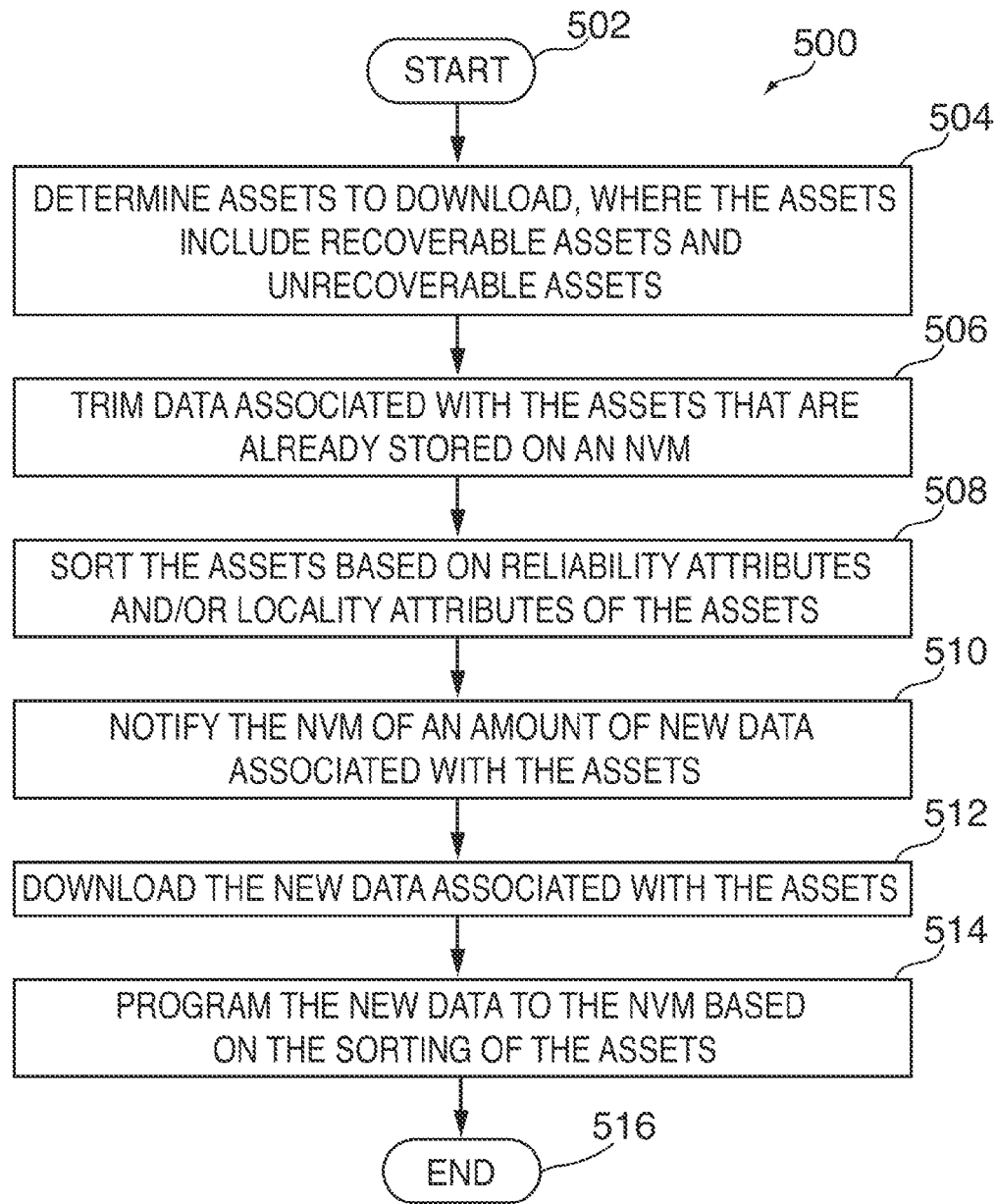
FIG. 5 is a flowchart of an illustrative process for bulk sync of a system having a non-volatile memory in accordance with various embodiments of the invention.

FIG. 5 is a flowchart of an illustrative process 500 for bulk sync of a system having an NVM (e.g., NVM 120 of FIG. 1 or NVM 220 of FIG. 2). The bulk sync may occur during a synchronization process of the system with a data source (e.g., a local or remote data source). Process 500 may begin at step 502, and at step 504, an NVM interface (e.g., NVM interface 118 of FIG. 1 or NVM interface 218 of FIG. 2) can determine assets to download, where the assets can include recoverable assets and unrecoverable assets. For example, the assets can include data (e.g., one or more files or media) that may be downloaded from a remote or local data source.

Continuing to step 506, the NVM interface can trim data associated with the assets that are already stored on an NVM. For example, data associated the assets to be downloaded may include a new version of an asset already stored on the NVM. Thus, by trimming the data, the NVM interface can ensure that there are no overlaps between existing data and data to be downloaded. Consequently, all of the data associated with the assets to be downloaded can be considered unique.

Then, at step 508, the NVM interface can sort the assets based on reliability attributes and/or locality attributes of the assets. In some embodiments, reliability attributes can include whether an asset (e.g., data associated with the asset) is recoverable or unrecoverable. Generally, in terms of reliability attributes, assets having unrecoverable attributes may be ranked higher than assets having recoverable attributes.

In other embodiments, locality attributes can include whether an asset is static or dynamic. As used herein, a "static" asset may be an asset that is rarely updated or changed. In contrast, a "dynamic" asset may be an asset that is frequently updated or changed. Generally, in terms of locality attributes, assets having static attributes may be ranked higher than assets having dynamic attributes.

Figure 6:
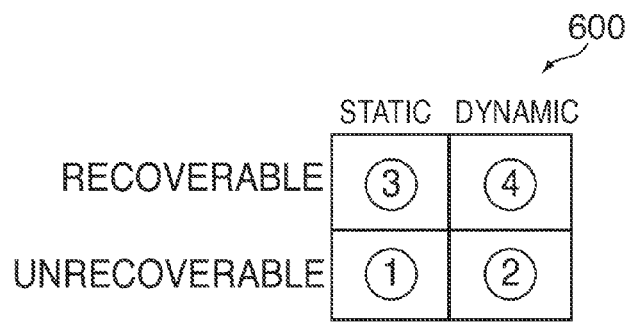
FIG. 6 is a table of illustrative rankings of assets in accordance with various embodiments of the invention.

For example, turning now to FIG. 6, a table 600 of illustrative rankings of assets is shown. As shown in table 600, assets may be classified as having four different sets of attributes (e.g., reliability and locality attributes): static-recoverable, dynamic-recoverable, static-unrecoverable, and dynamic-unrecoverable. In particular, assets having static-recoverable attributes may include assets such as music, movies, other media, and device applications, for example. These assets may be rarely updated, and may also be recovered from a remote or local data source.

In comparison, assets having dynamic-recoverable attributes may include assets such as photos, information associated with a user's contacts, application screen shots, for example. Although these assets can be recovered from a remote or local data source, they may also be frequently updated.

Assets having static-unrecoverable attributes may include assets such as an operating system image, kernel(s), frameworks, and internal applications, for example. These assets may be rarely updated, and may not be recovered from a remote or local data source. However, they may be essential for proper functioning of a device (e.g., assets may be required during device boot-up).

Finally, assets having dynamic-unrecoverable attributes may include assets such as newly-captured photos and private data (e.g., passwords), for example. In some cases, these assets may have been transiently captured on a device, and the device may not yet have had an opportunity to synchronize the assets with a data source. This class of assets may also include assets that a user has selected not to synchronize with a data source (e.g., non-data source application data).

The numbers shown in FIG. 6 (e.g., "1" to "4") may correspond to the rankings of the different classes of assets, where "1" is considered the "least" reliable asset (e.g., static-unrecoverable) and "4" is considered the "most" reliable asset (e.g., dynamic-recoverable). Persons skilled in the art will appreciate these rankings are merely illustrative, and that the different classes of assets may be ranked differently depending on one or more characteristics of a system. For example, in some embodiments, dynamic-recoverable assets may be considered less reliable than static-recoverable assets.

Referring back to FIG. 5, after sorting the assets based on reliability and/or locality attributes, at step 510, the NVM interface can notify the NVM of an amount of new data associated with the assets. For example, the amount of new data can include a first amount of new data associated with recoverable assets and a second amount of new data associated with unrecoverable assets. In some embodiments, these two amounts can be transmitted to the NVM as two parameters in a function (e.g., an application programming interface ("API") function).

Then, at step 512, the NVM interface can download the new data associated with the assets. In some embodiments, the NVM interface can receive one or more write commands associated with the new data, where each write command can include a designator indicating if data associated with the command corresponds to a recoverable or unrecoverable asset.

Continuing to step 514, the NVM interface can program the new data to the NVM (e.g., one or more blocks or super blocks of the NVM) based on the sorting of the assets. In some embodiments, the NVM interface can program the new data associated with the recoverable assets before the new data associated with the unrecoverable assets. Process 500 may then end at step 516.

In some embodiments, based on the reliability and/or locality attributes of the assets that are received, the NVM interface can internally separate corresponding new data into one or more flows or streams while programming the new data. For example, if the reliability attributes indicate that an asset is recoverable or unrecoverable, the NVM interface can employ a process similar to process 300 (FIG. 3) to determine one or more flows (e.g., a SLC flow and/or a bulk flow) for programming corresponding new data.

That is, the NVM interface can first attempt to program all of the new data in a SLC mode. If the NVM interface determines that not all of the new data can be stored in the SLC mode, the NVM interface can determine an amount of the new data to program in a bulk mode. In some cases, there may be a strong preference for storing new unrecoverable data in the most reliable mode. Hence, the NVM interface can attempt to program new data associated with unrecoverable assets in block(s) or super block(s) that are configured in SLC modes.

Figure 8:
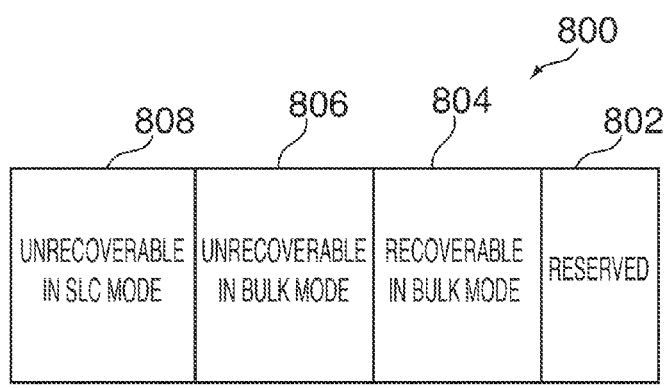
FIG. 8 is another illustrative configuration of a non-volatile memory in accordance with various embodiments of the invention.

For example, turning now to FIG. 8, an illustrative configuration of NVM 800 is shown. NVM 800 may include reserved space 802 that is not available for programming. Persons skilled in the art will appreciate that NVM 800 may also include other portions that are not shown in FIG. 8. For example, NVM 800 may include one or more portions that are already stored with data.

If an NVM interface (e.g., NVM interface 118 of FIG. 1 or NVM interface 218 of FIG. 2) determines that not all new data can be programmed in a SLC mode, the NVM interface can first program new recoverable data 804 in a bulk mode. This may free up an amount of space in NVM 800 that would not otherwise be available if new recoverable data 804 was programmed in a SLC mode.

After programming new recoverable data 804, if there is still a constraint on the amount of space that is available for programming, the NVM interface can program a portion of new unrecoverable data 806 in a bulk mode. Generally, however, the NVM interface will attempt to reduce the amount of unrecoverable data that is saved in the bulk mode. Once the NVM interface determines that there is no longer a constraint on the amount of space that is available for programming, the NVM interface can program remaining new unrecoverable data 808 in a SLC mode.

As another example, if the NVM interface receives reliability attributes indicating whether an asset is recoverable or unrecoverable and also locality attributes indicating whether the asset is static or dynamic, the NVM interface can employ a different process to determine one or more flows or streams for programming the new data. For instance, turning now to FIG. 7, an illustrative configuration of NVM 700 is shown. The numbers (e.g., 1-4) shown in FIG. 7 can correspond to the rankings of different classes of assets provided in FIG. 6. That is, "1" can correspond to static-unrecoverable assets, "2" can correspond to "dynamic-unrecoverable" assets, and so forth.

Figure 7:
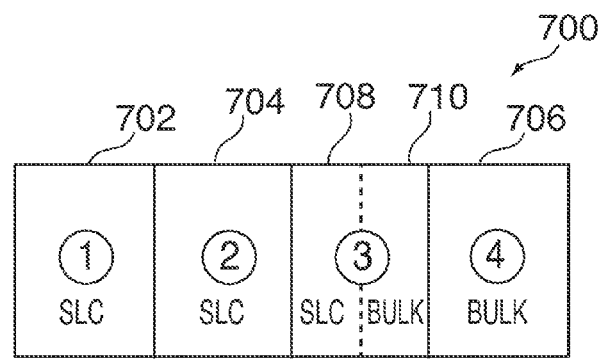
FIG. 7 is an illustrative configuration of a non-volatile memory in accordance with various embodiments of the invention.

Persons skilled in the art will appreciate that the configuration shown in FIG. 7 may include only a portion of NVM 700. For example, NVM 700 may also include a reserved space (not shown in FIG. 7). As another example, NVM 700 may include one or more portions that are already stored with data.

Based on the rankings of the different classes of assets, the NVM interface can internally separate corresponding new data into a SLC flow and a bulk flow while programming the new data. Thus, as an example, new static-unrecoverable data 702 and new dynamic-unrecoverable data 704 can be programmed in a SLC mode. In contrast, new dynamic-recoverable data 706 can be programmed in a bulk mode. Moreover, depending on the amount of available space on NVM 700, the NVM interface can program a first portion of new static-recoverable data 708 in a SLC mode and a second portion of new static-recoverable data 710 in a bulk mode. Persons skilled in the art will appreciate that this is merely an illustrative example, and that new data can be sorted in any suitable manner based on one or more factors such as, for example, the corresponding classes of assets and the amount of available space on the NVM.

In other embodiments, instead of separating new data into flows associated with modes of blocks or super blocks of an NVM (e.g., a SLC flow and a bulk flow), the NVM interface can separate the new data into flows or streams associated with particular attributes. For example, turning now to FIG. 9, a flowchart of illustrative process 900 for programming data in multiple flows is shown.

Process 900 may begin at step 902, and at step 904, an NVM interface (e.g., NVM interface 118 of FIG. 1 or NVM interface 218 of FIG. 2) can receive data from a file system (e.g., file system 210 of FIG. 2). For example, the data may be transmitted from one or more applications.

Continuing to step 906, the NVM interface can determine whether reliability attributes of the data have a macroscale alternating pattern. As used herein, data can have a "macroscale alternating pattern" when there are interleaving patterns of reliability attributes (e.g., recoverable/unrecoverable/recoverable, etc.) at a coarse granularity. That is, the write order of the data can be sorted based on different reliability classes. This can be in contrast to a "microscale alternating pattern", which can refer to a scenario where there are interleaving patterns of reliability attributes at a fine granularity. Persons skilled in the art will appreciate that, in other embodiments, the NVM interface can determine whether locality attributes of the data have a macroscale alternating pattern.

If, at step 906, the NVM interface determines that the reliability attributes of the data do not have a macroscale alternating pattern, process 900 may move to step 908. In other words, the NVM interface may have determined that the reliability attributes have a microscale alternating pattern.

At step 908, the NVM interface can program the data in four streams (e.g., four open host flows) to four super blocks of an NVM (e.g., NVM 120 of FIG. 1 or NVM 220 of FIG. 2). The four streams can correspond to four sets of attributes: static-recoverable, dynamic-recoverable, static-unrecoverable, and dynamic-unrecoverable.

For example, a first portion of data having static-unrecoverable attributes can be programmed to a first super block, and a second portion of data having dynamic-recoverable attributes can be programmed to a second super block. In some embodiments, the first super block can be configured in a SLC mode (e.g., single bit per cell mode), and the second super block can be configured in a bulk mode (e.g., multiple bits per cell mode). In addition, the remaining portions of data (e.g., data associated with attributes of static-recoverable and dynamic-unrecoverable) can be stored in third and fourth super blocks. The third and fourth super blocks can be configured in modes that are based on one or more suitable factor(s) such as, for example, the amount of current consumption and the available space in the NVM. In some cases, the sorting of the data into the four streams can be performed inside the NVM software stack at the time of programming.

Accordingly, by separating the data into four streams associated with four different super blocks, there can be no blending of data having different attributes in the physical space. Persons skilled in the art will appreciate that flows can also be directed to different portions of an NVM such as, for example, different blocks of the NVM. Process 900 may then end at step 910.

Referring back to step 906, if the NVM interface instead determines that the reliability attributes of the data have a macroscale alternating pattern, process 900 may move to step 912. At step 912, the NVM interface can identify attributes associated with the macroscale alternating pattern. For example, the NVM interface can identify that the macroscale alternating pattern includes recoverable attributes followed by unrecoverable attributes and further followed by recoverable attributes, etc. (e.g., recoverable/unrecoverable/recoverable).

Continuing to step 914, the NVM interface can program the data in two streams (e.g., two open host flows) to two super blocks of the NVM based on the attributes associated with the macroscale alternating pattern. For example, if the macroscale alternating pattern is recoverable/unrecoverable/recoverable, one of the streams can be a static stream that is programmed to a first super block, and the other stream can be a dynamic stream that is programmed to a second super block. Persons skilled in the art will appreciate that the super blocks can be configured in any suitable mode based on the characteristics of the data and the NVM (e.g., an amount of available space in the NVM). Process 900 may then end at step 910.

In some embodiments, while the NVM interface is programming the data in two streams, the NVM interface can simultaneously monitor other attributes of the data. For example, if the two streams are static and dynamic streams, the NVM interface can monitor the recoverable/unrecoverable reliability attributes of the data. Similarly, if the two streams are recoverable and unrecoverable streams, the NVM interface can monitor the static/dynamic locality attributes of the data. Consequently, when it is later determined to be necessary, the NVM interface can separate the data into any suitable number of streams (e.g., one or more streams). For example, the NVM interface can use a garbage collection process to sort the data based on the attributes.

In other embodiments, instead of using multiple flows, the NVM interface can program data in a single flow, where the flow can change its properties based on changes in the attributes of incoming data. For example, responsive to receiving a large amount of data all sharing a particular set of attributes (e.g., static-recoverable, dynamic-recoverable, static-unrecoverable, or dynamic-unrecoverable), the NVM interface can begin to program the data in a single flow to a super block configured in a mode (e.g., SLC or bulk mode) that is based on the set of attributes. Then, as additional data is received, the NVM interface may detect a change in the set of attributes that is associated with the new data.

Based on this detection, the NVM interface can apply a suitable policy for programming the new data. For example, if more than a particular percentage of the super block that is currently being programmed has already been filled (e.g., 75%), the NVM interface may continue programming the new data to the super block until the super block is fully programmed. However, if the super block has not been filled to the particular percentage, the NVM interface can allocate a new super block that is configured in a mode based on the changed set of attributes.

In further embodiments, the NVM interface can algorithmically place data in different modes based on the age of the data. For example, if the data is older data, the NVM interface can place the data on a block or super block of the NVM that is configured in a MLC mode. In some embodiments, in order to accomplish this result, the NVM interface can configure a destination block or super block of garbage collection (e.g., a free block or super block) in a MLC mode. In contrast, if the data is newer data, the NVM interface can place (e.g., program) the data on a super block that is configured in a SLC mode. As a result, in such a system, newer data may be accessed more quickly than older data.

Figure 9:
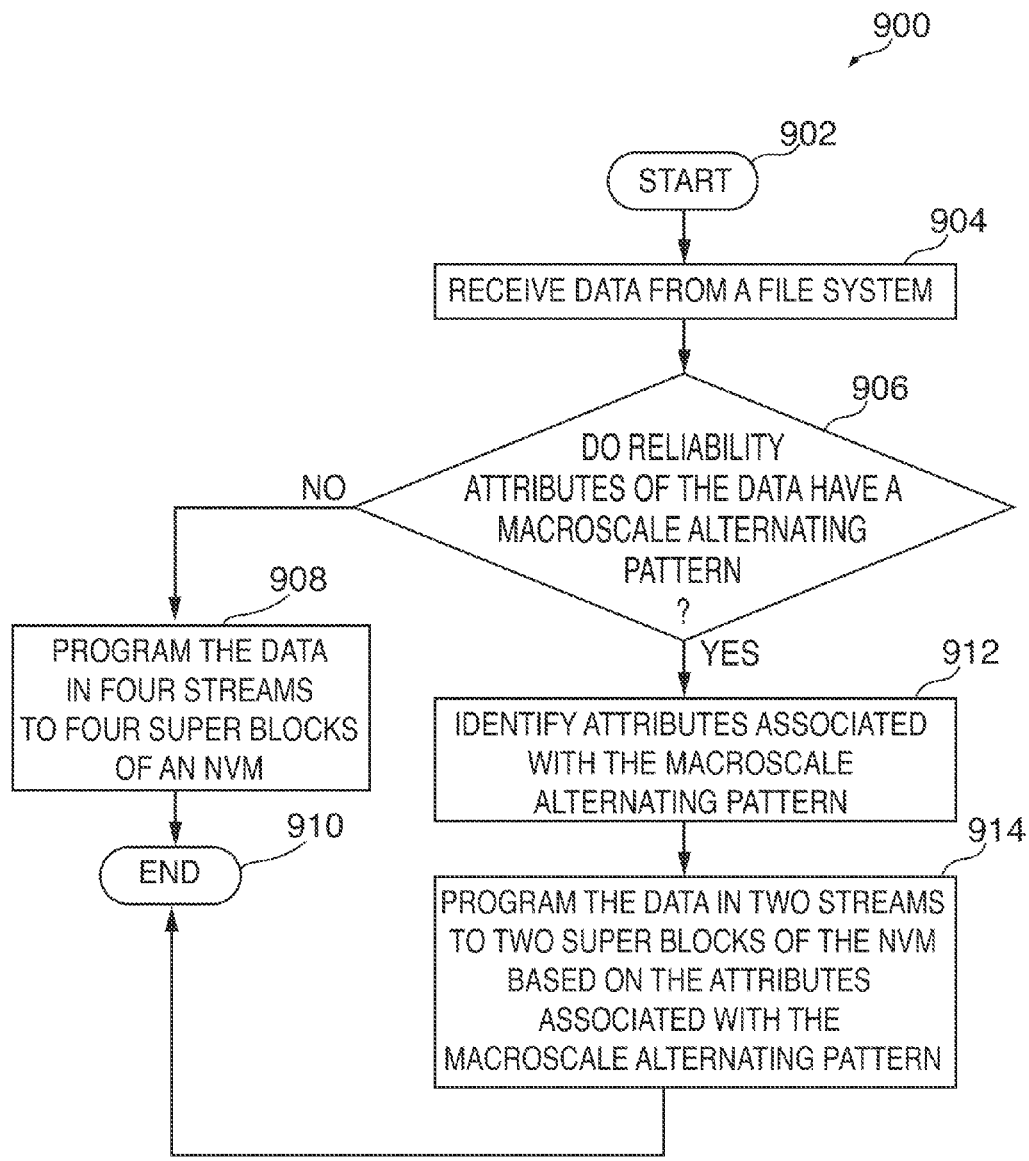
FIG. 9 is a flowchart of an illustrative process for programming data in multiple flows to a non-volatile memory in accordance with various embodiments of the invention.

It should be understood that processes 300, 500, and 900 of FIGS. 3, 5, and 9 may be executed by one or more components in a system (e.g., electronic device 100 of FIG. 1 or electronic device 200 of FIG. 2). Persons skilled in the art will appreciate that one or more of the steps may be performed by a control circuitry (e.g., SoC control circuitry 112 of FIG. 1), an NVM interface (e.g., NVM interface 118 of FIG. 1 or NVM interface 218 of FIG. 2), or a controller of the NVM.

Furthermore, it should be understood that processes 300, 500, and 900 of FIGS. 3, 5, and 9 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for utilizing multi-modal memory, the method comprising:
   receiving a command from an application comprising information associated with new data, wherein the information associated with the new data comprises an amount of recoverable new data and an amount of unrecoverable new data;
   determining an estimated consumption of available space of a non-volatile memory ("NVM") by the new data and data currently stored in the NVM, wherein the estimated consumption uses the amount of recoverable new data and the amount of unrecoverable new data as estimation factors;
   determining whether a difference between the available space and the estimated consumption is greater than a pre-determined threshold; and
   in response to determining that the difference between the available space and the estimated consumption is greater than the pre-determined threshold, determining an amount of the new data that needs to be programmed in a first mode of the NVM.

2. The method of claim 1, further comprising determining to program a remaining amount of the new data in a second mode of the NVM.

3. The method of claim 1, wherein the first mode is a bulk mode.

4. The method of claim 3, wherein the bulk mode is one of two bits per cell mode and three bits per cell mode.

5. The method of claim 2, wherein in response to determining that the difference between the available space and the estimated consumption is one of less than and equal to the pre-determined threshold, determining to program the new data in the second mode of the NVM.

6. The method of claim 5, wherein the second mode is a single bit per cell ("SLC") mode.

7. The method of claim 5, wherein the first mode is a more reliable and less space efficient mode than the second mode.

8. The method of claim 1, further comprising determining to program a remaining amount of the new data in at least two modes of the NVM.

9. The method of claim 1, wherein the at least two modes of the NVM comprises at least two of a SLC mode, a SLC-XOR mode, and a bulk-XOR mode.

10. The method of claim 1, wherein the pre-determined threshold is forty percent of the available space of the NVM.

11. The method of claim 1, wherein the available space in the NVM excludes an amount of reserved space.

* * * * *